UNITED STATES PATENT OFFICE.

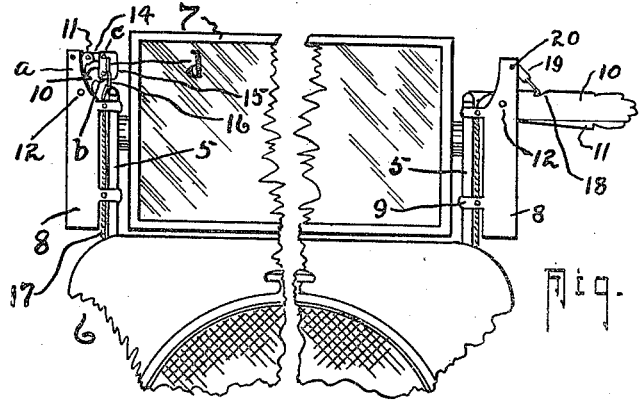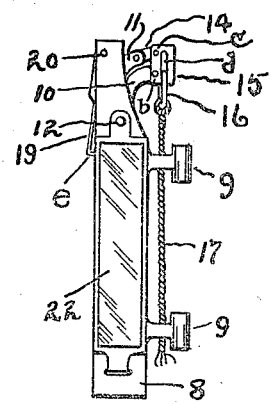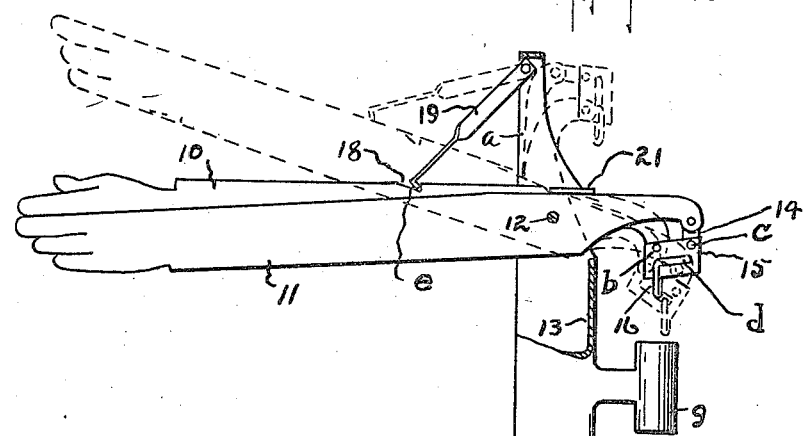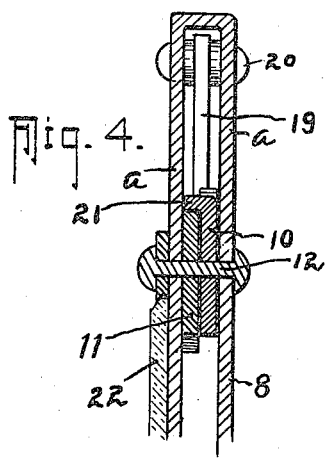

ARTHUR STRUNGE, OF OMAHA, NEBRASKA.

DIRECTION-INDICATOR FOR VEHICLES.

1,282,975.     Specification of Letters Patent.     Patented Oct. 29, 1918.

Application filed January 21, 1918. Serial No. 212,960.

*To all whom it may concern:*

Be it known that I, ARTHUR STRUNGE, a citizen of the United States, residing at Omaha, in the county of Douglas and State of Nebraska, have invented certain new and useful Improvements in Direction-Indicators for Vehicles, of which the following is a specification.

This invention relates to a direction indicator for vehicles, and more particularly for automobiles, and has for its principal object to provide a device for this purpose which will be convenient in use and may be economically manufactured.

The invention consists of the novel construction, combination and arrangement of parts as described herein and claimed, and as illustrated in the accompanying drawing, wherein:—

Figure 1 is a broken away view showing the front part of an automobile with the device applied, one of the signals being extended. Fig. 2 is a view showing the rear side of a housing or case for containing an index or signal. Fig. 3 is an enlarged view, partly broken away, showing the front side of the housing, the signal being extended. Fig. 4 is a view showing the upper part of the housing in longitudinal section, the signal being extended.

Referring now to the drawing, the invention is shown in connection with upright supports 5 at the sides and near the front of an automobile 6, preferably adjacent to the windshield 7, this being near the driver's seat for convenient control. However, while it is preferred to mount the signals or direction indicators as mentioned, it will be seen that they would be fully operative if mounted upon other parts of the vehicle.

The invention consists, in part, of the pair of casings 8, each being substantially of U-shape in cross-section, and provided with suitable brackets 9 so that they may be maintained upright when mounted upon a support 5.

Numerals 10 and 11 indicate a pair of arms provided for each casing 8, and since the parts for each casing are practically identical in structure, a description of one is considered to be sufficient.

It will be understood that the arms 10 and 11 constitute a single signal, each having a pivotal mounting near one of its ends upon a pin or bolt 12, above the upper terminal of the back 13 of the casing, as best shown in Fig. 3, said pin being mounted in the sides $a$ which extend somewhat above the back 13.

The arm 11, preferably, has a greater length than the arm 10, and projects inwardly from the pivotal mounting 12 somewhat farther than the arm 10, arm 11 being provided at its inner terminal with a comparatively short lever 14 pivotally mounted thereon.

Numeral 15 indicates a plate pivotally mounted as indicated at $b$ and $c$ near its upper edge, respectively, upon the inner end of arm 10 and upon the lever 14, said plate being provided near its lower edge with a slot $d$, said slot being rectilinear and disposed equidistant from the pivotal mounting $b$ and $c$, and providing a mounting for a link 16 or equivalent holder for a flexible strand or cord 17.

As thus described a downward pull on the cord 17, obviously, will cause the main part of arm 10 to swing upwardly. This arm is provided with a notch 18 having an undercut wall adapted to be engaged by the catch $e$ of the latch or pawl 19, the latter being pivotally mounted at 20 between the side plates $a$ of the casing above the pivotal mounting 12, and being disposed in the plane of arm 10 as best shown in Fig. 4.

An upward swinging movement of the main part of arm 10 will cause, coincidently therewith, a like movement of arm 11, since the arm 10, as clearly shown in Figs. 3 and 4 is provided at its upper edge, near its inner end, with a flange 21 which overlays the inner end of arm 11. When the outer end of arm 10 swings upwardly against the force of gravity, by use of the cord 17, the flange 21 will be pressed downwardly upon the inner end of arm 11 which causes the outer ends of said arms 10 and 11 to move upwardly, said movements being coincident.

The arms 10 and 11 of each pair are normally disposed vertically within a casing 8, and are practically protected from the weather, and in operation, a driver of the vehicle may readily signify his intention, at a crossing, of turning to the right or left by the means described, and thereafter the arms will drop by action of gravity when the latch or catch 19 is released from the arm 10, this being accomplished by the driver causing a downward pull upon the cord 17 when the link 16 is disposed at the end of the slot $d$ adjacent to the pivotal mounting $c$ of the lever 14.

It will be seen that the plate 15 operates as a rock lever. The normal position of the arms is best shown in Fig. 2, the pawl 19, on account of its weight, being disposed substantially in a vertical position, the link 16 engaging in that end of the slot $d$ nearest to the pivotal mounting $b$, and as explained, the arms will be swung outwardly by a downward pull upon the cord, the arc of movement being substantially 90 degrees. When it is desired to cause the arm 10 to be released from the catch 19, the operator, by a movement of the cord, causes the link 16 to move to the opposite end of the slot $d$ adjacent to the pivot $c$, beyond the end of the arm 10, and by causing a downward pull of the cord, the catch will be released from the notch 18 by means of the arm 11 swinging upward and disengaging the catch $e$ of the pawl 19 from the notch. The plate 15 then having a swinging movement, its center of movement being the pivot $b$, the arms 10 and 11 swinging downwardly, by gravity, within the casing.

It will be noted that the catch will not reëngage with the notch while the arms are being lowered, this being prevented by means of the straight upper edge of the arm 11 being in alinement with the arm 10 during this part of the operation, and as illustrated by the dotted lines in Fig. 3 the catch will slide over the notch.

Numerals 22 indicate reflectors which are attached to the rear side of the casings 8 for use of a driver to distinguish objects at the rear of the vehicle.

Among some of the advantages to be derived by use of the invention it may be stated that the parts may be constructed for the most part, of sheet metal and, comparatively at a very limited expense. The casings and arms may have an adequate length, and when mounted in an upright position, as described, they will not be obtrusive. While I have described construction in detail, I do not wish to be understood as limiting myself in this respect, and changes in minor details as well as changes in form, size and proportion may be made without departing from the invention in accordance with the appended claims.

What I claim as my invention and desire to secure by Letters Patent is:—

1. In a direction indicator for vehicles, a normally vertical arm pivotally mounted near one of its ends, a catch-member having a pivotal mounting above the pivotal mounting of said arm, said arm being adapted to have a swinging movement to permit engagement thereof with the catch-member for maintaining said arm in substantially a horizontal position, a second arm movable with the first named arm, and adapted to have a swinging movement for disengaging a catch-member from said first named arm to permit the arms to swing to substantially a vertical position.

2. In devices for the purpose described, an upright housing a catch-member pivotally mounted thereon, an arm, a second arm, said arms being normally disposed vertically within and pivotally connected near one of their ends with said housing, said arms being movable coincidently to substantially a horizontal position for engagement of the first named arm with said catch-member, said second arm being adapted to have a swinging movement to cause disengagement of the first named arm from the catch-member to permit said arms to move to their normal position.

3. In devices for the purpose described, an upright housing, a catch-member pivotally mounted thereon, an arm, a second arm, said arms being normally disposed vertically within and pivotally connected near one of their ends with said housing, a lever pivotally connected with the second arm, an operating-plate provided with a slot and having a pivotal connection with said lever and with said first named arm, said operating-plate having a part engaging in the slot for moving said plate to cause a movement of said arms to a horizontal position for engagement of the first named arm with the catch-member, and for moving said plate to cause a movement of the second arm for disengaging the first named arm from the catch-member, to permit the arms to move to a vertical position.

In testimony whereof I have affixed my signature in presence of two witnesses.

ARTHUR STRUNGE.

Witnesses:
ARTHUR H. STURGES,
HIRAM A. STURGES.

Copies of this patent may be obtained for five cents each, by addressing the "Commissioner of Patents, Washington, D. C."